US010338875B2

(12) United States Patent
Norton

(10) Patent No.: US 10,338,875 B2
(45) Date of Patent: Jul. 2, 2019

(54) SEAM FOR VISUALLY SUPPRESSING A GAP BETWEEN TWO ADJACENT REFLECTIVE SURFACES

(71) Applicant: CAE INC, Saint-Laurent (CA)

(72) Inventor: Paul Norton, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 121 days.

(21) Appl. No.: 15/086,094

(22) Filed: Mar. 31, 2016

(65) Prior Publication Data

US 2017/0286043 A1    Oct. 5, 2017

(30) Foreign Application Priority Data

Mar. 31, 2016    (CA) ...................................... 2925796

(51) Int. Cl.
*G06F 3/14* (2006.01)
*G06F 3/03* (2006.01)
(Continued)

(52) U.S. Cl.
CPC ......... *G06F 3/1446* (2013.01); *G02B 6/0031* (2013.01); *G02B 6/0055* (2013.01); *G02B 6/0068* (2013.01); *G02B 6/0073* (2013.01); *G02B 7/182* (2013.01); *G02B 27/0101* (2013.01); *G02B 27/0977* (2013.01);
(Continued)

(58) Field of Classification Search
CPC ...... G06F 3/0304; G06F 3/0308; G06F 3/042; G06F 3/0421; F21Y 2113/13; F21Y 2115/10; G02B 6/0068; G02B 6/0053; G02B 6/0055; G02B 6/0073; G02B 6/0028; G02B 6/0018; G02B 6/0031; G02B 6/0016; G02B 17/004; G02B 17/27; G02B 17/017; G02B 17/0101; G02B 17/0093; G02B 17/0977; G02B 2027/0178; G02B 2027/014; G02B 2027/0118; G09G 2320/0233; G09G 2320/0626; G09G 2340/14; G09G 3/003; G09G 3/001; G09G 2300/0408; G02F 1/133308; G02F 1/133536; G02F 1/133627

See application file for complete search history.

(56) References Cited

U.S. PATENT DOCUMENTS 6,061,489 A * 5/2000 Ezra .................... G02B 27/0093
313/115
6,271,808 B1 * 8/2001 Corbin ............... G02B 27/0172
345/7
(Continued)

*Primary Examiner* — Dismery Mercedes
(74) *Attorney, Agent, or Firm* — Fasken Martineau Dumoulin LLP

(57) ABSTRACT

The present seam visually suppresses a gap defined between two adjacent reflective surfaces. The seam comprises a strip of light propagating material and a plurality of lighting units. The strip of light propagating material defines a front surface, two side surfaces and a back surface. The side surfaces of the strip of light propagating material is adapted for being positioning in the gap defined between the adjacent reflective surfaces. The lighting units are positioned along the back surface of the strip of light propagating material and are adapted for propagating light in the strip of light propagating material. When light is propagated in the strip of light propagating material, the gap between the two adjacent reflective surfaces is visually suppressed.

13 Claims, 6 Drawing Sheets

(51) Int. Cl.
*F21V 8/00* (2006.01)
*G02B 27/01* (2006.01)
*G02B 27/09* (2006.01)
*G06F 3/042* (2006.01)
*G09B 9/32* (2006.01)
*G02B 7/182* (2006.01)
*G03B 21/60* (2014.01)

(52) U.S. Cl.
CPC ........... *G03B 21/60* (2013.01); *G06F 3/0304* (2013.01); *G06F 3/0308* (2013.01); *G06F 3/042* (2013.01); *G09B 9/32* (2013.01); *G02F 2203/09* (2013.01); *G09G 2340/14* (2013.01)

(56) References Cited

U.S. PATENT DOCUMENTS

| | | | | |
|---|---|---|---|---|
| 6,814,578 | B2 | 11/2004 | Vorst | |
| 6,989,935 | B2* | 1/2006 | Domjan | G02B 27/0172 345/8 |
| 7,346,234 | B2* | 3/2008 | Davis | G02B 6/29311 385/15 |
| 8,045,273 | B2* | 10/2011 | Chen | G03B 33/12 353/33 |
| 8,115,937 | B2* | 2/2012 | Needham | G01J 5/38 356/450 |
| 8,610,154 | B2* | 12/2013 | Song | H01L 33/60 257/98 |
| 9,720,279 | B2* | 8/2017 | Kim | G02F 1/133603 |
| 10,184,623 | B2* | 1/2019 | Vasylyev | F21V 3/06 |
| 2003/0160919 | A1* | 8/2003 | Suzuki | G02F 1/133555 349/113 |
| 2006/0291238 | A1* | 12/2006 | Epstein | G02B 6/0055 362/600 |
| 2007/0152839 | A1* | 7/2007 | Dalzell | G06F 11/3044 340/686.1 |
| 2008/0206720 | A1 | 8/2008 | Nelson | |
| 2011/0032223 | A1* | 2/2011 | Okamoto | G02F 1/167 345/204 |
| 2011/0234619 | A1* | 9/2011 | Tokunaga | G02B 26/101 345/589 |
| 2012/0235891 | A1* | 9/2012 | Nishitani | G02B 3/0056 345/102 |
| 2012/0307490 | A1* | 12/2012 | Ellis | F21V 3/049 362/235 |
| 2013/0201227 | A1* | 8/2013 | Miyazaki | G09G 5/10 345/690 |
| 2014/0252336 | A1* | 9/2014 | Kobayashi | G09G 3/3225 257/40 |
| 2015/0168681 | A1* | 6/2015 | Han | G02B 13/009 348/347 |
| 2015/0188091 | A1* | 7/2015 | Kudo | H01L 51/5271 257/88 |
| 2016/0091785 | A1* | 3/2016 | Inoko | G03B 21/2066 353/31 |
| 2016/0313491 | A1* | 10/2016 | Li | G09G 3/2003 |

* cited by examiner

SEAM FOR VISUALLY SUPPRESSING A GAP BETWEEN TWO ADJACENT REFLECTIVE SURFACES

TECHNICAL FIELD

The present disclosure relates to the field of reflective displays, and more particularly to a seam for visually suppressing a gap between two adjacent reflective surfaces.

BACKGROUND

Commercial airlines are highly regulated to ensure public's security. One aspect of the security measures requires regular training and evaluation of the pilots. Pilots are trained in a controlled environment called a flight simulator.

Flight simulators recreate the cockpit and overall environment experience in which the pilots fly aircrafts. Flight simulators recreate the look and feel of the instruments in the cockpit, the out-of window view available before, during and after a flight, as well as the movements of the aircraft felt in the cockpit.

One of the numerous challenges when building a flight simulator lies in providing a realistic out-of-window view. Many factors concur for creating a realistic out-of window view. A first criteria is related to the field of view provided to a pilot in an aircraft. Typically, a pilot has a 220° field of view, i.e. 110° on each side of the nose of the plane. Secondly, to recreate the feeling of depth in the out-of window view presented to the pilot, images to be displayed are projected on a large curved rear-projection screen and which is viewed by a large reflective surface which is positioned at a certain distance from the pilot. Thirdly, the display system can be mounted on a moving simulator platform or be fixed in place and non-moving.

To overcome these challenges, many flight simulators manufacturers use a flexible reflective surface made of MYLAR®. MYLAR® is lightweight and can be somewhat curved. However, as Mylar stretches, it is not possible to achieve a perfect curvature and as a result the out-of window view displayed to the pilot is distorted in some areas.

Other flight simulators manufacturers use sheets of mirrors, installed one next to another, to form the reflective surface. However, because of the inherent movement of the flight simulator, a slight gap is left between the sheets of mirrors to prevent scraping, chipping and breaking of the edges of one sheet of mirror with the adjacent sheet of mirror. As no image is reflected by the gap between the sheets of mirrors, the gap can be visually perceived by the pilot in the flight simulator. The gap negatively affects the realism of the out-of window view of the pilot in the flight simulator, and is considered annoying by some.

There is therefore a need for improving the out-of window view presented to a pilot during training or evaluation in a flight simulator.

SUMMARY

The present disclosure relates to a seam for visually suppressing a gap defined between two adjacent reflective surfaces. The seam comprises a strip of light propagating material and a plurality of lighting units. The strip of light propagating material defines a front surface, two sides surfaces and a back surface. The side surfaces of the strip of light propagating material are adapted for being positioned in the gap between the adjacent reflective surfaces. The lighting units are positioned along the back surface of the strip of light propagating material and are adapted for propagating light in the strip of light propagating material. When light is propagated in the strip of light propagating material, the gap between the two adjacent reflective surface is visually suppressed.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present invention generally address various drawbacks related to large reflective displays.

Figure 1:
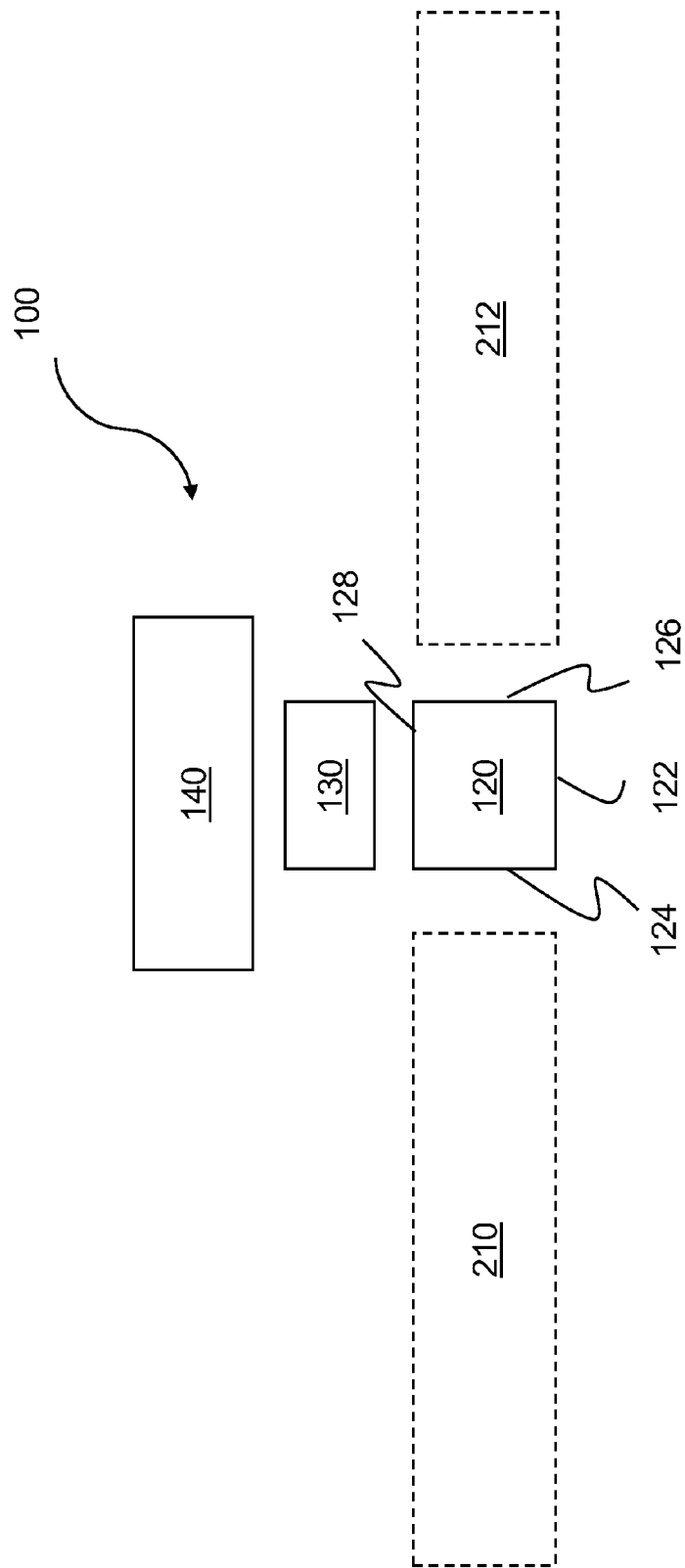
FIG. 1 is a schematic view of a seam in accordance with the present invention for visually suppressing a gap between two reflective surfaces.

Referring now to FIG. 1, there is shown a schematic view of the present seam 100. The seam 100 is adapted for being positioned between two adjacent reflective surfaces 210, 212. In operation, the seam 100 visually suppresses a gap between the two adjacent reflective surfaces 210, 212 so that when an image is reflected on the reflective surfaces 210, 212, and the present seam 100 is actuated, the gap between the two reflective surfaces 210, 212 visually reduces and the two reflective surfaces 210, 212 appear visually connected.

The seam 100 comprises a strip 120 of light propagating material. The strip 120 of light propagating material defines a front surface 122, two sides surfaces 124, 126 and a back surface 128. The side surfaces 124, 126 are adapted for positioning between the adjacent reflective surfaces 210, 212. The front surface 122 is adapted for visually suppressing the gap between the two adjacent reflective surfaces 210, 212 when the seam is actuated. More particularly, the front surface 122 is shaped so that when light is propagated from the back 128 of the strip 120 of light propagating material to the front 122 of the strip of the light propagating material, the light propagated is distributed substantially evenly along the front 122 of the strip 120 of light propagating material.

The strip 120 of light propagating material is shown on FIG. 1 as having a square shape. However, the strip 120 of light propagating material may have any shape appropriate to substantially evenly distributing light propagated therein. For example, the strip 120 of light propagating material may have a circular cross-sectional shape, an oblong cross-sectional shape, a rectangular cross-sectional shape, etc.

The strip 120 of light propagating material is shown on FIG. 1 as being positioned between the reflective surfaces 210, 212. Such representation is for facilitating the incorporation of reference numerals only. In use, the strip 120 of light propagating material is securely installed between the reflective surfaces 210, 212. To facilitate its installation between the two reflective surfaces 210, 212, the strip 120 of light propagating material is made of a material that is flexible. The flexibility of the strip 120 of light propagating material allow its installation between the reflective surfaces 210, 212, after the reflective surfaces 210, 212 have been securely fixed. To ensure a tight fit with the reflective surfaces 210, 212, the strip 120 of light propagating material may also be compressible. By being flexible and compressible, the strip 120 of light propagating material ensures an easy installation between the reflective surfaces 210, 212, as well as a tight fit between the reflective surfaces 210, 212. Furthermore, as the edges of the reflective surfaces 210, 212 may not be perfectly parallel, the flexibility and compressibility of the strip 120 of light propagating material compensates for the unevenness of the edges of the reflective surfaces 210, 212.

When the present seam 100 is used between reflective surfaces 210, 212 of a flight simulator, the strip 120 of light propagating material further absorbs the vibrations and movements between the reflective surfaces 210, 212, thereby further preventing chipping or cracking along the edges of the reflective surfaces 210, 212.

The strip 120 of light propagating material is further made of a material that allows light propagation therein. For example, the strip 120 of light propagating material is made of any of the following: a clear material, a semi-clear material, a semi-opaque material and/or a light scattering material. Alternatively, the 120 of light propagating material may have a front 122, back 128 and interior made of light propagating material, while the sides 124, 126 do not propagate light. For example, the sides 124, 126 could be painted or covered with a material having a dark or opaque color.

The strip 120 of light propagating material could have a hollow center between the front 122, the sides 124, 126 and the back 128. Alternatively, the strip 120 of light propagating material could have a solid center.

The strip 120 of light propagating material may be made of any of the following materials, either used solely, or in combination such as for example in sandwiched configuration: silicone, latex, plastic, or white closed-cell foam.

The seam 100 further comprises a plurality of lighting units 130. FIG. 1 shows only one lighting unit 130 for simplicity purposes, but the present seam 100 typically includes a plurality of lighting units distributed along the back 128 of the strip 120 of light propagating material. The plurality of lighting units 130 generate the light to be propagated in the strip 120 of light propagating material.

FIG. 1 shows that the lighting unit 130 is of the same size as the strip 120 of light propagating material. However, the lighting unit 130 could be of different dimensions than the strip 120 of light propagating material, and could even be larger than the strip 120 of light propagating material. In the event that the lighting units 130 are larger than the strip 120 of light propagating material, a lens could be installed between the lighting unit 130 and the strip 120 of light propagating material to focus the light generated by the lighting unit 130 into the strip 120 of light propagating material.

The plurality of lighting units 130 are distributed along the back 128 of the strip 120 of light propagating material along a length of the reflective surfaces 210, 212. The plurality of lighting units 130 may be distributed evenly, i.e. at equal distance from one another along the back 128 of the strip 120 of light propagating material, or be distributed so as to visually connect the reflective surfaces 210, 212 where the seam or gap there between is more visible.

The plurality of lighting units 130 may be positioned against the back 128 of the strip 120 of light propagating material. Alternatively, the plurality of lighting units 130 may be positioned at a predetermined distance from the back 128 of the strip 120 of light propagating material.

Figure 2:
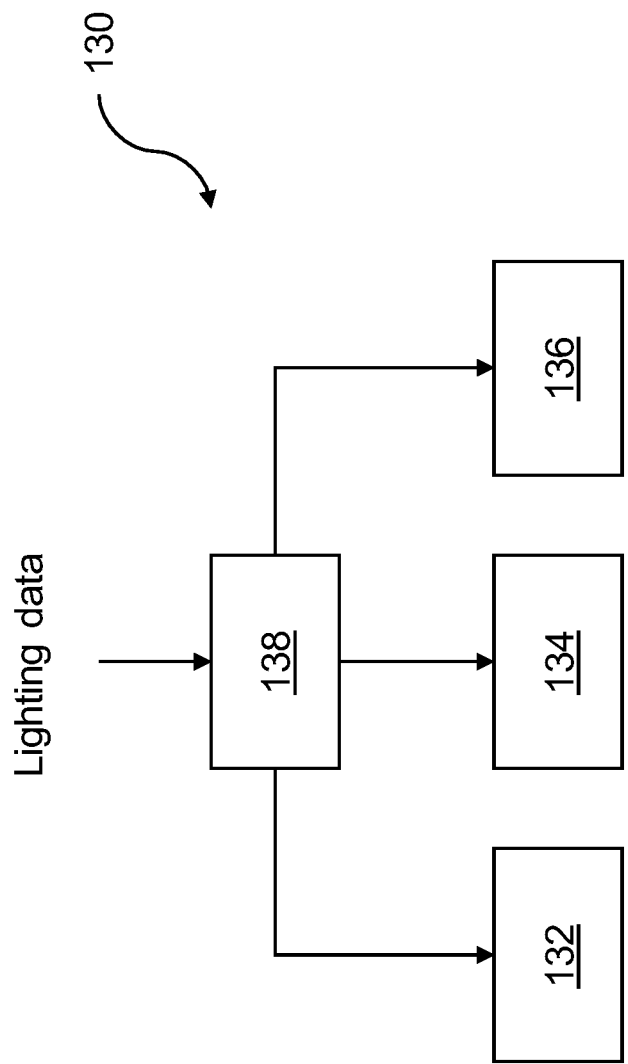
FIG. 2 is a schematic view of a lighting unit in accordance with the present invention.

Reference is now made concurrently to FIGS. 1 and 2, where FIG. 2 is a schematic representation of one lighting unit 130. Each lighting unit 130 comprises a red light-emitting diode (LED) 132, a green LED 134 and a blue LED 136. Each lighting unit 130 further comprises a light controller 138. The light controller 138 receives lighting data. The lighting data comprises a light intensity information for the red LED 132, for the green LED 134 and for the blue LED 136. The light controller 138 controls the generation of light by the red LED 132, the green LED 134 and the blue LED 136, based on the lighting data received. The light controller 138 receives the lighting data, and processes the received lighting data using any of the following transfer-function methods: area intensity averaging, running average box-car filtering, finite impulse response filtering (FIR), frequency-shift data replacement and individual red, green and blue intensity modulation, or any combination thereof.

Figure 3:
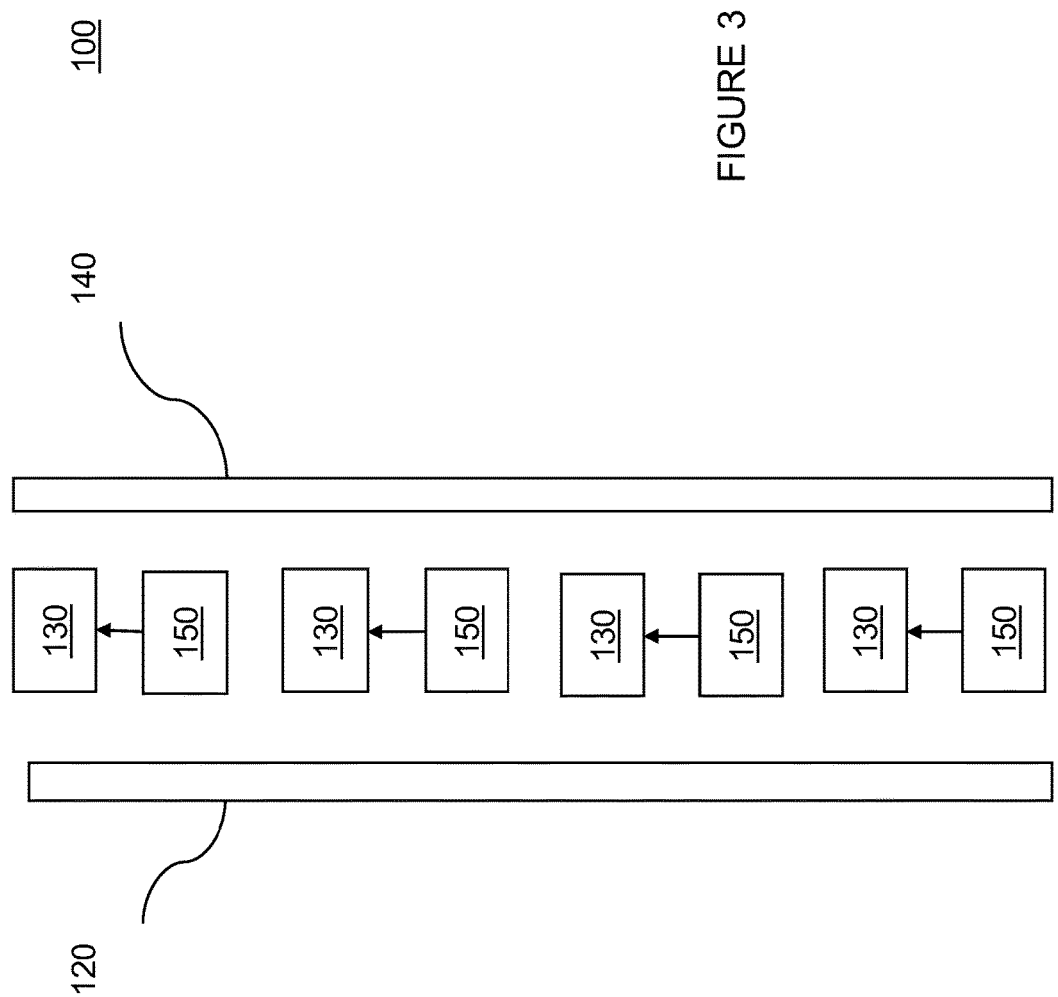
FIG. 3 is another schematic view of the present seam in accordance with the present invention.

Reference is now concurrently made to FIGS. 1, 2 and 3, where FIG. 3 is another schematic view of the present seam 100. More particularly, FIG. 3 represents an exploded view of the present seam 100, where the various elements are separated from each other to simplify the schematic representation. The seam 100 comprises a support structure 140. The support structure 140 receives and secures the plurality of lighting units 130. The support structure may be made of a solid material, or may be made of a semi-flexible material. The support structure 140 is substantially of the same length as the strip 120 of light propagating material. The support structure 140 may be of the same width as the back 128 of the strip 120 of light propagating material, or may be wider. The support structure 140 further receives the back 128 of the strip 120 of light propagating material. The back 128 of the strip 120 of light propagating material may fixedly affixed to the support structure 140 by glue or any other means for fixing materials such as the light propagating material to a solid or semi-flexible support structure 140. Alternately, the back 128 of the strip 120 of light propagating material may be inserted within a channel (not shown) defined in the support structure 140. The channel receives and slightly compresses the back 128 of the strip 120 of light propagating material so as to retain the back 128 of the strip 120 of light propagating material fixed along the support structure 140.

The seam 100 further comprises a plurality of light detectors 150. Each light detector generates lighting data that is forwarded to a light controller 138 of a corresponding lighting unit 130. Each light detector 150 may consist of any of the following: an optic fiber conductor with a very small input aperture (e.g. pin-hole) inserted through the strip 120 of light propagating material, an LED light detector, a photosensor, a photodetector, a photocell, a miniature CCD camera, or any combination thereof. Each light detector 150 detects an intensity and color or light in an area of the reflective surfaces adjacent to the strip 120 of light propagating material where the light detector 150 is positioned. The light detector 150 generates from the detected intensity and color of the light detected lighting data. The lighting data is provided to the light controller 138 of the corresponding lighting unit 130. In a typical implementation, each lighting unit 130 is associated with a corresponding lighting detector 150. Each lighting unit 130 and corresponding lighting detector 150 may be implemented as two separate components, or be co-located in a single component. Each lighting detector 150 is also affixed to the support structure 140 by means known in the art for affixing components to a solid or semi-flexible material.

The strip 120 of light propagating material is affixed to the support structure 140 in such a manner that it facilities the insertion of the strip 120 of light propagating material between the reflective surfaces 210, 212. By maintaining the strip 120 of light propagating material from the back 128 onto the support structure 140 it makes is simple to gently compress the strip 120 of light propagating material between the two adjacent reflective surfaces 210, 212. Compression of the strip 120 of light propagating material between the two adjacent reflective surfaces 210, 212 may suffice to maintain the seam in position between the two adjacent reflective surfaces 210, 212.

FIG. 3 shows an implementation where the lighting units 130 and the light detectors 150 are positioned between the strip 120 of light propagating material and the support structure 140. However, the present seam 100 is not limited to such an implementation. Depending on the size of the lighting units 130 and the light detectors 150, the lighting units and/or light detectors 150 could be positioning on the other size of the support structure, i.e. on the side opposite to the strip 120 of light propagating material. Alternatively, the lighting units 130 and the light detectors 150 could be positioned on sides of the support structure 140, behind one of the reflective surfaces 210, 212. To that effect, the support structure 140 could be provided with a series of aperture for allowing the collection of light by the light detectors 150, and the propagation of light inside the strip 120 of light propagating material by the lighting units 130.

As the strip 120 of light propagating material is inserted and compressed between the adjacent reflective surfaces 210, 212, and the support structure 140 is mounted on the back 128 of the strip 120 of light propagating material, the adjacent reflective surfaces 210, 212 may move with respect to one another during for example a flight simulation. Movement of the reflective surfaces 210, 212 with respect to one another, while having the strip 120 of light propagating material act as an absorbing material between the adjacent reflective surfaces 210, 212 prevents contact between the adjacent reflective surfaces 210, 212, and therefor the possible grinding, scratching, chipping and cracking of the adjacent reflective surfaces 210, 212 during particularly agitated simulations.

Figure 4:
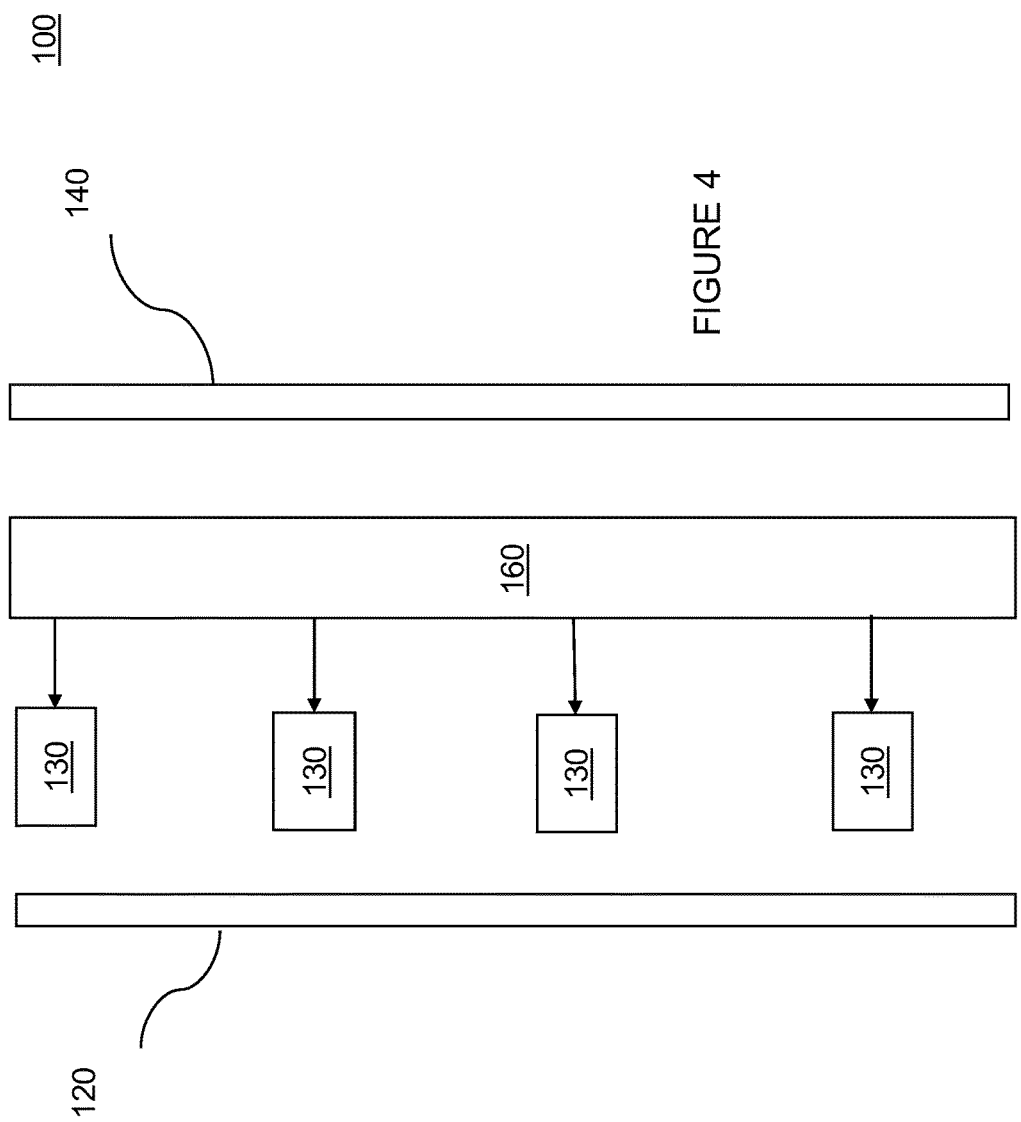
FIG. 4 is another schematic view of the present seam in accordance with the present invention.

Reference is now concurrently made to FIGS. 1, 2 and 4, where FIG. 4 depicts an alternative implementation of the present seam 100. More particularly, FIG. 4 is a schematic representation of the present seam 100, exploded for clarity purposes, in which the lighting data is received through an input/output unit 160. In this embodiment, the lighting data is received through input/output unit 160, which provides the lighting data to the lighting units 130. The input/output unit 160 may be in wired or wireless communication with an image generator, which will be discussed later. The input/output unit 160 may be positioned between the strip 120 of light propagating material and the support structure 140. Alternatively, the input/output unit 160 may be positioned on a side of the support structure that is different than the side on which the strip 120 of light propagating material is affixed. The input/output unit 160 may communicate with one or a plurality of the lighting units 130. The seam 100 may further include a plurality of input/output units 160, each input/output unit 160 forwarding the lighting data to the corresponding lighting units 130.

Typically, the input/output unit 130 receives the lighting data for a plurality of lighting units 130. To ensure that the input/output unit 130 forwards the lighting data to the correct lighting units 130, the lighting data is sent to the input/output unit using a standard or proprietary protocol, and each lighting data is associated with one of the lighting units 130. The input/output unit 160 thus receives either through wires or wireless the lighting data for the corresponding lighting units 130, and dispatches the lighting data to appropriate output ports in electronic communication with the corresponding lighting units 130.

Alternatively, the input/output unit 160 may correspond to a communication bus, which receives the lighting data and dispatch the received lighting data to the corresponding lighting units 130.

In this implementation, the red LED 132, the green LED 134 and the blue LED 136 are thus controlled by their respective light controller 138 based on the lighting data received from an image generator.

Figure 5:
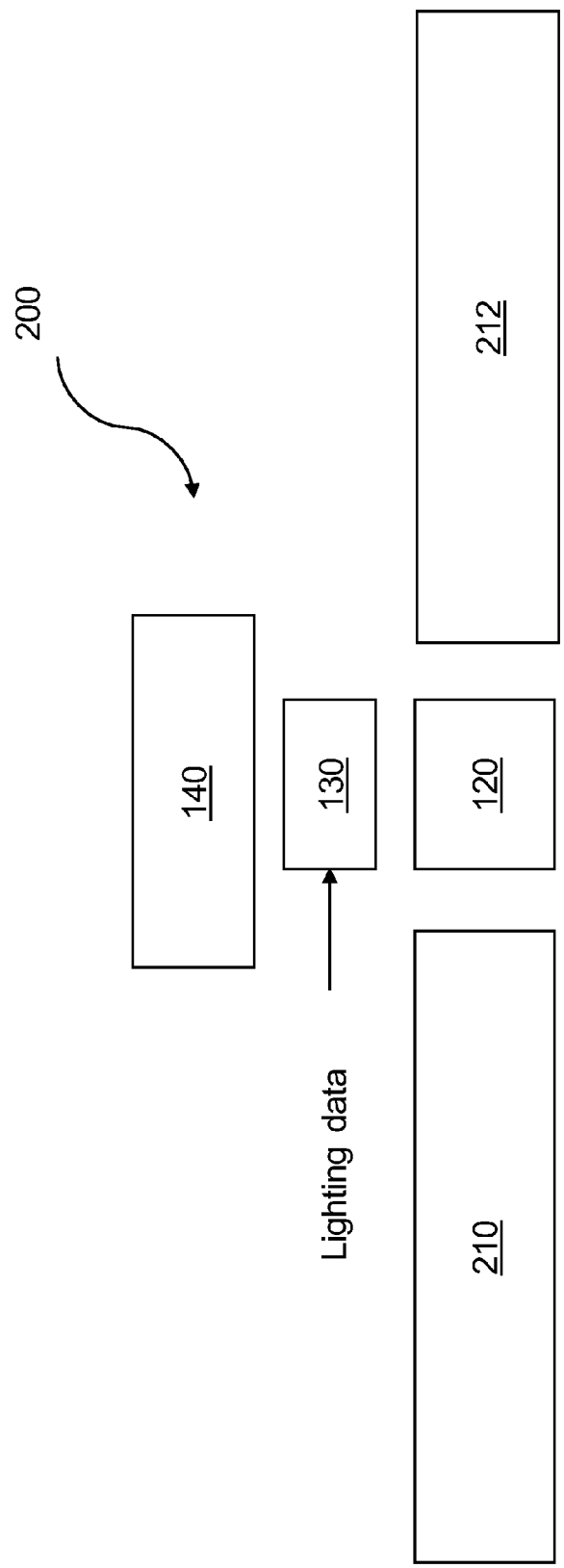
FIG. 5 is schematic cross-sectional view of a reflective display in accordance with the present invention.

Reference is now made to FIG. 5, which is an exploded schematic representation of a reflective display 200 incorporating the present seam 100. The present reflective display 200 comprises two adjacent reflective surfaces 210, 212. The reflective surfaces 210, 212 may consist of any of the following: sheets of mirrors, MYLAR® sheets mounted on frames, or any similar reflective surfaces which can be used to design a large reflective display 200. Although FIG. 5 depicts two reflective surfaces 210, 212 and one vertical seam 100, the present reflective display 200 is not limited to such a number of reflective surfaces 210, 212 and number and/or positioning of the seam 100. For example, an out-of-window reflective display to be used for a flight simulator could comprise five consecutive reflective surfaces, each two consecutive reflective surfaces being visually connected by one seam. Hence, an out-of-window reflective display could be constructed using five reflective surfaces and four seams.

The reflective display 200 includes the seam previously discussed. Although FIG. 5 depicts the seam 100 implementation of FIG. 4, in which the lighting data is received from an image generator, the present reflective display 200 is not limited to the implementation of FIG. 4. Alternatively, the reflective display 200 could include the seam previously discussed with respect to FIG. 3, in which the lighting data was collected by the light detectors 150 mounted therewith.

Figure 6:
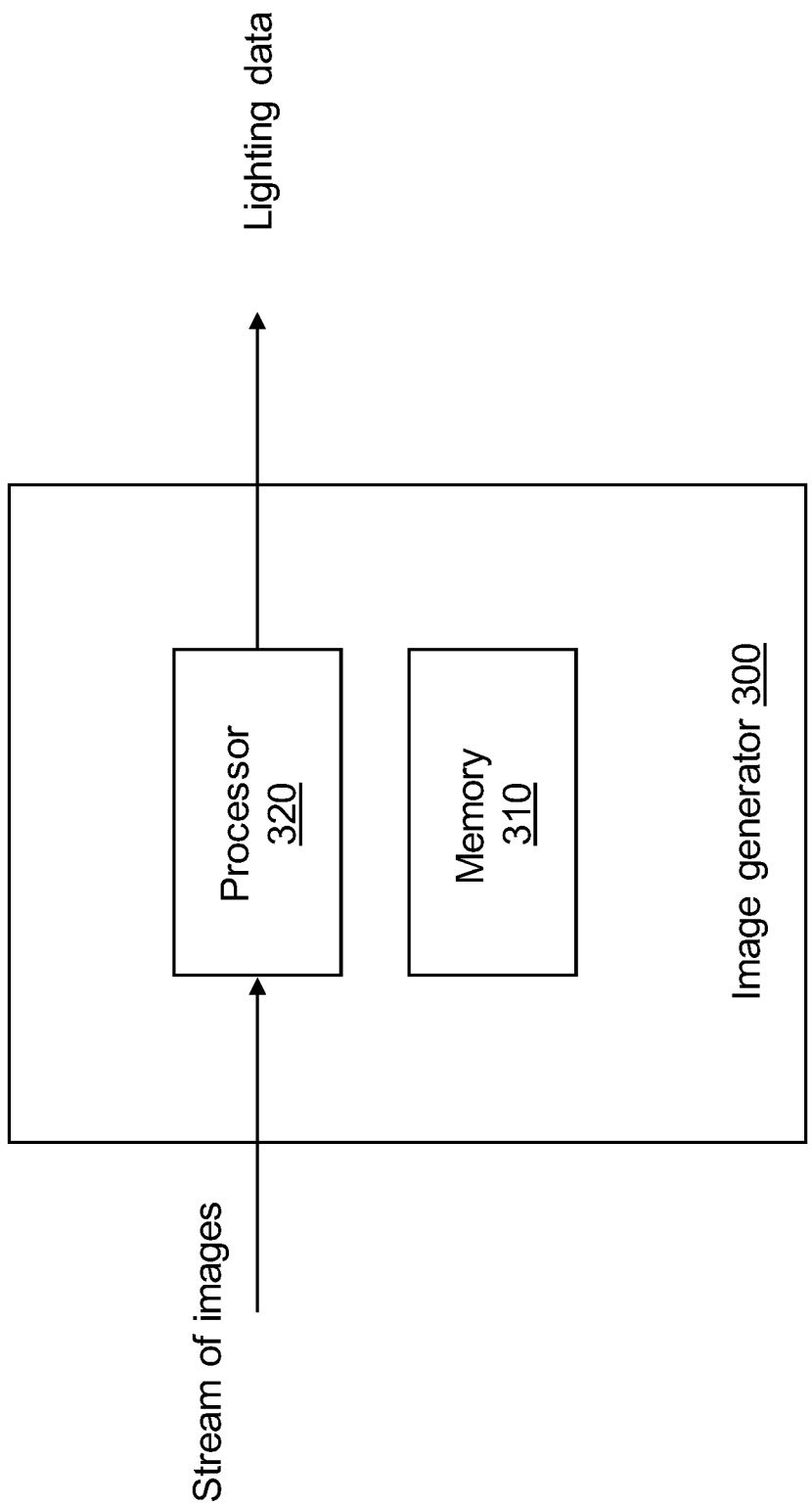
FIG. 6 is a schematic view of an image generator in accordance with the present invention.

Reference is now made concurrently to FIGS. 1-5 and 6, where FIG. 6 schematically depicts an image generator 300 for use with the present seam 100 and/or the reflective display 200. The image generator 300 may be used concurrently with a simulator, a display driver, a display buffer, etc. The image generator 300, in operation, visually adjoins the seam 100 between the two reflective surfaces 210, 212 by generating lighting data based on a stream of images to be directly or ultimately reflectively displayed on the reflective surfaces 210, 212. The image generator 300 comprises memory 310 and a processor 320. The memory 310 stores position of the seam 100 on the reflective display 200.

The processor 320 receives the stream of images to be reflectively displayed on the reflective surfaces 210, 212. The processor 320 analyses the stream of images to be displayed on the reflective display 200, to determine the colors and light intensity of the pixels positioned in the vicinity of the seam 100. For example, the processor 320 may extract from the memory 310 the position of the seam 100 on the reflective display 200, and determine the average color and light intensity for a predetermined number of pixels on each side of the seam 100, to generate the lighting data to be provided to the lighting units 130. To reduce processing power, the stream of images may be stored in memory 310, and sampled so as to analyze the colors and light intensity for a predetermined number of pixels on each side of the seam, for one out of every two, three, four or five images. The processor 320 may determine the average color and light intensity of the pixels on each side of the seam using any of the following transfer-function methods: area intensity averaging, running average box-car filtering, finite impulse response filtering (FIR), frequency-shift data replacement and individual red, green and blue intensity modulation, or any combination thereof. The processor 320 may average the color and light intensity on the pixels on each side of the seam for any of the following: independently for each image, averaged over a predetermined number of consecutive images, or averaged over a predetermined number of sampled images.

The processor 320 communicates via wired or wirelessly with the plurality of lighting units 130, and sends to each lighting unit 130 the corresponding lighting data, thereby controlling the lighting units 130.

Although the present seam, reflective display and image generator have been described hereinabove by way of non-restrictive, illustrative embodiments thereof, these embodiments may be modified at will within the scope of the appended claims without departing from the spirit and nature of the present disclosure.

The invention claimed is:

1. A reflective display comprising:
   two adjacent reflective bodies being positioned side-by-side and spaced apart by a gap and each one of the two adjacent reflective bodies comprising a front reflective surface for displaying a stream of images thereon; and
   a seam inserted in the gap between the two adjacent reflective bodies, the seam comprising:
      a strip of light propagating material, the strip of light propagating material defining a front surface, two sides surfaces and a back surface, the side surfaces being positioned between the adjacent reflective bodies and the front surface of the strip of light propagating material being aligned with the front reflective surfaces of the adjacent reflective bodies;
      a plurality of lighting units positioned along the back surface of the strip of light propagating material for propagating light in the strip of light propagating material towards the front surface of the strip of light propagating material, whereby when light is propagated in the strip of light propagating material, the gap between the two adjacent reflective bodies is visually suppressed; and
      a plurality of light detectors, the light detectors being positioned along the strip of light propagating material, each light detector for collecting light projected on the reflective surfaces in an area surrounding the light detector and generating corresponding lighting data,
   wherein each lighting unit comprises: a red light-emitting diode (LED), a green LED and a blue LED, and each lighting unit further comprises a light controller for controlling actuation of the red LED, the green LED and the blue LED.

2. The reflective display of claim 1, wherein the lightning units are positioned along the back of the strip of light propagating material at equal distances from one another.

3. The reflective display of claim 1, wherein the strip of light propagating material is flexible.

4. The reflective display of claim 1, wherein the strip of light propagating material is compressible.

5. The reflective display of claim 1, wherein the strip of light propagating material is flexible and compressible.

6. The reflective display of claim 1, wherein the strip of light propagating material is made of one of the following: a clear material, a semi-clear material or a semi-opaque material.

7. The reflective display of claim 1, wherein the strip of lighting propagating material is made of a light scattering material.

8. The reflective display of claim 1, further comprising a support structure for securing the plurality of lighting units.

9. The reflective display of claim 8, wherein the support structure allows the light propagating material to be inserted and compressed between the two adjacent reflective bodies.

10. The reflective display of claim 9, wherein the support structure allows the two adjacent reflective bodies to move with respect to one another.

11. The reflective display of claim 1, wherein the light controller of each lighting unit receives the lighting data of at least one of the plurality of light detectors and controls the red LED, the green LED and the blue LED based on the received lighting data.

12. The reflective display of claim 1, wherein the light controller receives the lighting data from an image generator and controls the red LED, the green LED and the blue LED based on the lighting data received from the image generator.

13. The reflective display of claim 12, wherein the light controller receives the lighting data from the image generator wirelessly.

* * * * *